United States Patent [19]

Murata

[11] Patent Number: 5,373,611
[45] Date of Patent: Dec. 20, 1994

[54] CLIP

[75] Inventor: Norihiko Murata, Yokohama, Japan

[73] Assignee: NIFCO Inc., Japan

[21] Appl. No.: 66,194

[22] Filed: May 25, 1993

[30] Foreign Application Priority Data

May 26, 1992 [JP] Japan .............................. 4-034907[U]
May 21, 1993 [JP] Japan .............................. 5-026605[U]

[51] Int. Cl.$^5$ ........................ A44B 17/00; F16B 19/00
[52] U.S. Cl. ......................................... 24/297; 24/289; 24/453; 411/510
[58] Field of Search ................. 24/297, 289, 453, 662, 24/563; 411/508, 510, 913

[56] References Cited

U.S. PATENT DOCUMENTS

| | | | |
|---|---|---|---|
| 3,181,411 | 5/1965 | Mejlso | 411/508 |
| 3,217,584 | 11/1965 | Amesbury | 411/508 |
| 4,261,243 | 4/1981 | Palmer | 24/297 |
| 4,396,329 | 8/1983 | Wollar | 411/510 |

FOREIGN PATENT DOCUMENTS

| | | | |
|---|---|---|---|
| 3907362 | 9/1989 | Germany | 24/297 |
| 62-92312 | 6/1987 | Japan . | |
| 4-48330 | 11/1992 | Japan . | |
| 5-14613 | 2/1993 | Japan . | |
| 1396103 | 6/1975 | United Kingdom | 411/510 |

Primary Examiner—Victor N. Sakran
Attorney, Agent, or Firm—Parkhurst, Wendel & Rossi

[57] ABSTRACT

A clip. A leg portion is inserted through a mounting hole formed in a member to be mounted, and into a mounting hole formed in a holding member which holds the member to be mounted. A head portion is formed at one end portion of the leg portion. The member to be mounted is interposed between the head portion and the holding member and is fixed to the holding member. A core member is provided in the leg portion so as to extend from one end portion of the leg portion to another end portion of the leg portion. A plurality of supporting members are provided so as to extend in a radial direction from the core member and are provided along a longitudinal direction of the core member. A portion of an elastic deforming member is supported at respective distal end portions of the plurality of supporting members. The elastic deforming member is provided from the respective distal end portions of the plurality of supporting members along a circumferential direction of the mounting holes so as to correspond to a configuration of the mounting holes. Circumferential direction end portions of the elastic deforming member are elastically deformable in a substantially radial direction. An engaging member is provided so as to protrude from at least one free end portion, which is provided at the circumferential direction end portion of the elastic deforming member, toward an outside in the radial direction of the core member.

21 Claims, 25 Drawing Sheets

CLIP

BACKGROUND OF THE INVENTION

1. Field of the Invention

The present invention relates to a clip used as a fastener.

2. Description of the Related Art

As illustrated as an example in FIG. 21, in automobiles, an ordinary clip is used to fasten a luggage trim 20 to the interior of a panel 22 forming a trunk room 150. Clips 152 and 160 illustrated in FIGS. 22 and 24, respectively, are generally used for this type of clip.

As shown in FIG. 22, a plurality of elastic fins 156, which are elastically deformable in directions of insertion and withdrawal of the clip 152, is arranged along the axial direction of a leg portion 154 of the clip 152. As illustrated in FIG. 23, when the luggage trim 20 is to be fastened to the panel 22 using the clip 152, first, the leg portion 154 is inserted through a mounting hole 24 of the luggage trim 20. The leg portion 154 which has passed through the mounting hole 24 is fit into a mounting hole 26 which is formed in the panel 22. In this way, the elastic fins 156 pass through the mounting hole 26 while elastically deforming in the direction of arrow A. After the elastic fins 156 have passed through the mounting hole 26, the elastic fins 156 return to their original shapes due to their elastic force so as to engage with the edge portion of the mounting hole 26. The luggage trim 20 is thereby interposed between a bowl-shaped head portion 158 and the panel 22.

However, when the clip 152 is repeatedly inserted and removed in order to change the luggage trim 20 or the like, the elastic fins 156 become fatigued, and cracks or shearing is generated therein. Further, if the thickness of the panel 22 is thinner than the space between adjacent elastic fins 156, the peripheral edge of the mounting hole 26 is interposed between elastic fins 156. Removal of the clip 152 is thereby made difficult. Moreover, as illustrated in FIG. 24, there is the concern that protrusions 162 on the clip 160 will become fatigued and break. When the clip 160 is frequently inserted and removed, the protrusions 162 which are formed along a slit 164 are abraded. Further, as illustrated in FIG. 25, when the luggage trim 20 and the panel 22 are thick, the protrusions 162 positioned within the mounting holes 24, 26 are pushed by the wall surfaces of the mounting holes 24, 26 so as to withdraw toward the axis of the clip 160. Therefore, the diameter of an entire leg portion 166 decreases, and the portion of the protrusion 162 which engages with the peripheral edge of the mounting hole 26 is smaller. As a result, a drawback arises in that the clip 160 may inadvertently fall out. Further, a guide portion, which is, for example, substantially conical and which guides the leg portion 166 of the clip 160 through the mounting holes 24, 26, may be provided at the distal end of the leg portion 166. In such a case, because it is necessary to remove the clip 160 from a die by pulling the head portion 168 upwardly, holes for removing the clip 160 from the die are formed in the head portion 168 of the formed clip 160. As a result, the areas on the head portion 168 where the holes appear cannot be used.

Further, because this type of clip is formed under the premise that the respective mounting holes of the luggage trim 20 and the panel 22 have the same diameter, the clip cannot be used if the mounting holes have different diameters.

SUMMARY OF THE INVENTION

In view of the aforementioned, an object of the present invention is to provide a clip which can be easily removed from a holding member which is thin, and which engages securely with a holding member which is thick, and which can withstand repeated insertion and withdrawal, and which can be used even in mounting holes having different diameters.

The first aspect of the present invention is a clip which includes: a leg portion which is inserted through a mounting hole formed in a member to be mounted, and which is inserted into a mounting hole formed in a holding member which holds the member to be mounted; a head portion formed at one end portion of the leg portion, the member to be mounted being interposed between the head portion and the holding member so that the member to be mounted is fixed to the holding member; a core member provided in the leg portion so as to extend from one end portion of the leg portion to another end portion of the leg portion; a plurality of supporting members which are provided so as to extend in a radial direction from the core member and which are provided along a longitudinal direction of the core member; elastic deforming means, a portion of the elastic deforming means being supported at respective distal end portions of the plurality of supporting members, and the elastic deforming means being provided from the respective distal end portions of the plurality of supporting members along a circumferential direction of the mounting holes so as to correspond to a configuration of the mounting holes, and circumferential direction end portions of the elastic deforming means being elastically deformable in a substantially radial direction; and engaging means provided so as to protrude from at least one free end portion, which is provided at the circumferential direction end portion of the elastic deforming means, toward an outside in the radial direction of the core member.

In a second aspect of the present invention, the engaging means is a plurality of protrusions. The plurality of protrusions forms rows of protrusions, and protrusions of the rows of protrusions are provided at predetermined intervals along an axis of the core member, and a number of the rows of protrusions is an integer multiple of a number of the plurality of supporting members, and the rows of protrusions are provided so as to be parallel to each other. Respective positions of the protrusions of the rows of protrusions which are adjacent in a circumferential direction of the elastic deforming means are provided so as to not be on a same circumferential direction line which is orthogonal to an axial direction of the core member.

In a third aspect of the present invention, the elastic deforming means has a plurality of slits formed in a direction orthogonal to an axis of the core member.

In a fourth aspect of the present invention, the supporting member has a guide portion in a vicinity of the other end portion of the leg portion, a radial direction length of the guide portion becoming shorter toward the other end of the leg portion.

In a fifth aspect of the present invention, the elastic deforming means has a plurality of second slits which are cut out along an axis of the core member from an end portion of the elastic deforming means which faces the head portion. The elastic deforming means has an elastic pawl between each of the plurality of second slits and the free end portions. The elastic pawl is provided so as to protrude from an outer circumferential surface of the elastic deforming means toward the outside in the radial direction of the core member. When the leg portion is inserted through the mounting hole of the member to be mounted, the elastic pawl is pushed by the mounting hole so as to elastically deform toward an inside in the radial direction of the core member.

In a sixth aspect of the present invention, the elastic deforming means has a stopper which is provided so as to protrude from the outer circumferential surface of the elastic deforming means toward the outside in the radial direction of the core member and which is provided such that a distal end portion of the stopper in the radial direction of the core member has a larger diameter than a diameter of the mounting hole of the holding member when the stopper is in a free state. The member to be mounted is securely interposed between the stopper and the head portion.

In accordance with the first aspect of the present invention, the leg portion is inserted into the mounting hole formed in the member to be mounted and into the mounting hole formed in the holding member. The member to be mounted is thereby interposed between the head portion and the holding member and is fixed to the holding member. When the leg portion of the clip is inserted into the mounting holes, the engaging means, which protrude toward the outside in the radial direction from the free end portions of the elastic deforming means, which forms the leg portion, are pushed by the edge portion of the mounting hole. The elastic deforming means thereby bends in the direction of the core member so as to decrease the outer diameter of the leg portion. Because the areas from which the engaging means protrude deform elastically, there is no abrasion of the engaging means even if the leg portion is repeatedly inserted and withdrawn. Further, when the elastic deforming means passes through the mounting holes, the elastic deforming means returns to its original shape due to its elastic force. Because the engaging means engages with the edge portion of the mounting hole, the clip does not fall out from the mounting hole.

In accordance with the second aspect of the present invention, the engaging means is a plurality of protrusions. The plurality of protrusions forms rows of protrusions, and protrusions of the rows of protrusions are provided at predetermined intervals along an axis of the core member, and a number of the rows of protrusions is an integer multiple of a number of the plurality of supporting members, and the rows of protrusions are provided so as to be parallel to each other. Respective positions of the protrusions of the rows of protrusions which are adjacent in a circumferential direction of the elastic deforming means are provided so as to not be on a same circumferential direction line which is orthogonal to an axial direction of the core member. Accordingly, because a portion of the outer peripheral surface of the elastic deforming means abuts the edge portion of the mounting hole, there is no chatter after the clip is mounted.

In accordance with the third aspect of the present invention, the elastic deforming means has a plurality of slits formed in a direction orthogonal to an axis of the core member. As a result, not only do the free end portions of the elastic deforming means bend toward the core member around the distal end of the supporting member, but also both longitudinal direction end portions of the elastic deforming means bend in the direction of the core member around the slit. Namely, the elastic deforming means is divided by the slits at a line orthogonal to the axis of the core member. Therefore, the configuration of the elastic deforming means which has passed through the mounting holes is the same as the configuration of the elastic deforming means before insertion as the elastic deforming means is bent in the direction of the core member and is not effected by being pushed by the edge portion of the mounting hole. Accordingly, even if, for example, the holding member is thick, the engaging means can reliably engage with the edge portion of the mounting hole.

Further, in accordance with the fourth aspect of the present invention, the supporting member has a guide portion in a vicinity of the other end portion of the leg portion, a radial direction length of the guide portion becoming shorter toward the other end of the leg portion. Therefore, the leg portion is guided to the center of the mounting holes along the guide portions so that insertion of the leg portion is facilitated.

In accordance with the fifth aspect of the present invention, the elastic deforming means has a plurality of second slits which are cut out along an axis of the core member from an end portion of the elastic deforming means which faces the head portion. The elastic deforming means has an elastic pawl between each of the plurality of second slits and the free end portions. The elastic pawl is provided so as to protrude from an outer circumferential surface of the elastic deforming means toward the outside in the radial direction of the core member. When the leg portion is inserted through the mounting hole of the member to be mounted, the elastic pawl is pushed by the mounting hole so as to elastically deform toward an inside in the radial direction of the core member. Therefore, even if the respective diameters of the mounting hole of the holding member and the mounting hole of the member to be mounted are different, if the size of the outer circumference of the leg portion matches the diameter of the mounting hole of the holding member, the elastic pawl engages with the mounting hole of the member to be mounted.

In accordance with the sixth aspect of the present invention, the elastic deforming means has a stopper which is provided so as to protrude from the outer circumferential surface of the elastic deforming means toward the outside in the radial direction of the core member and which is provided such that a distal end portion of the stopper in the radial direction of the core member has a larger diameter than a diameter of the mounting hole of the holding member when the stopper is in a free state. The member to be mounted is securely interposed between the stopper and the head portion. Therefore, the clip is mounted in advance to the member to be mounted and does not fall out when the member to be mounted is installed at the holding member thereafter. The mounting operation is thereby carried out smoothly.

Because the clip of the present invention has the above-described structure, the clip can easily be removed even when the holding member is thin. Further, even if insertion and withdrawal thereof are repeated, there is no abrasion of the protrusions. Even when the holding member is thick, the protrusions reliably engage the edge portion of the mounting hole so that the clip does not fall out. Further, the clip can be used even when the diameters of the respective mounting holes of the holding member and the member to be mounted are different.

DESCRIPTION OF THE PREFERRED EMBODIMENT

Figure 1:
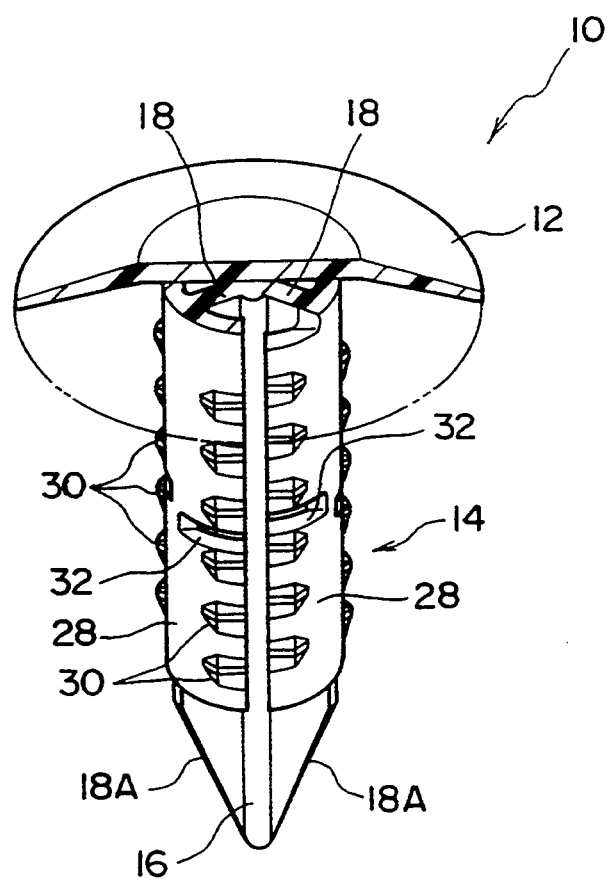
FIG. 1 is a perspective view of a clip relating to the present invention.
Figure 3:
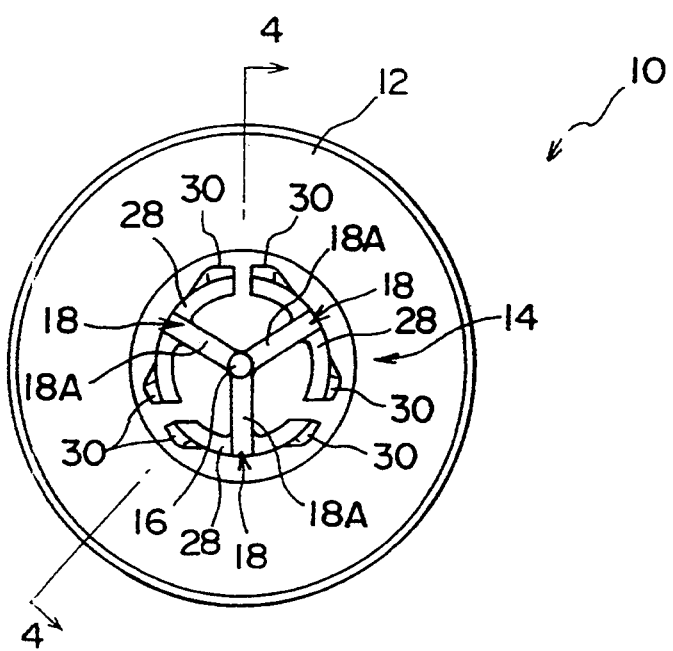
FIG. 3 is a bottom view of the clip relating to the present invention.
Figure 4:
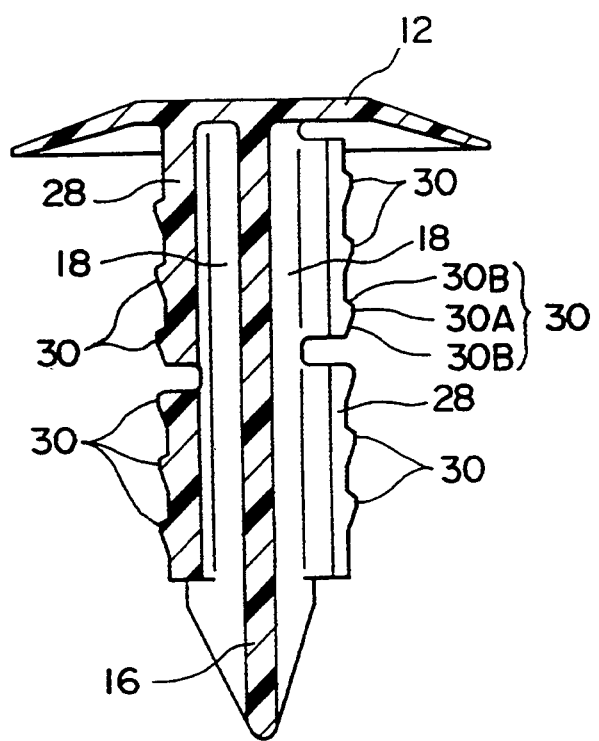
FIG. 4 is a sectional view taken along line 4—4 of FIG. 3.
Figure 5:
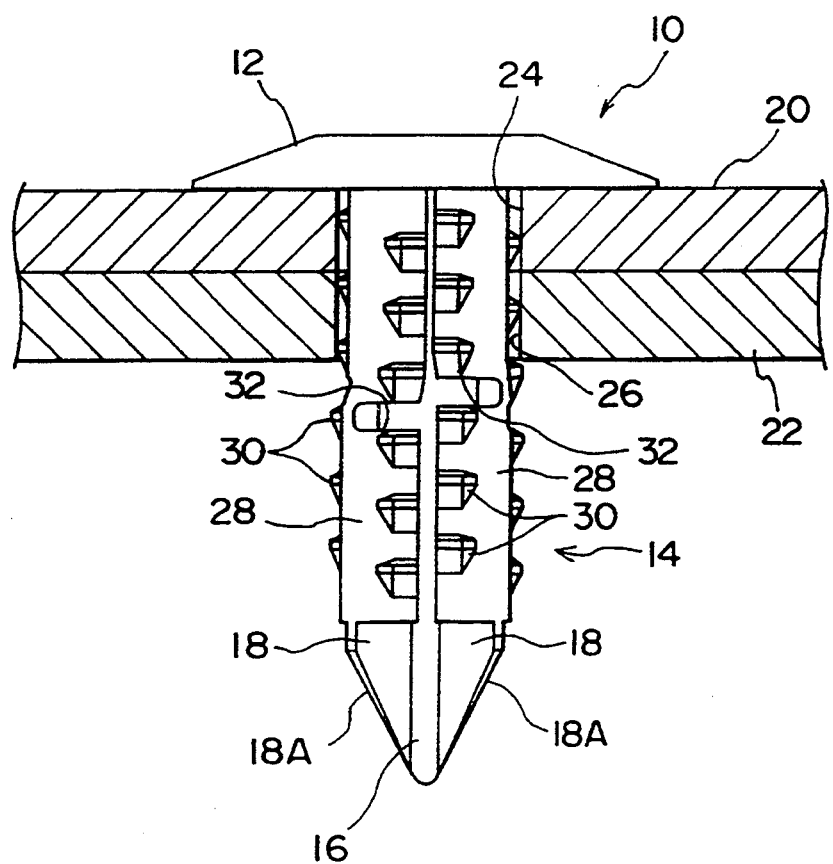
FIG. 5 is a sectional view illustrating an installed state of the clip relating to the present invention.
Figure 6:
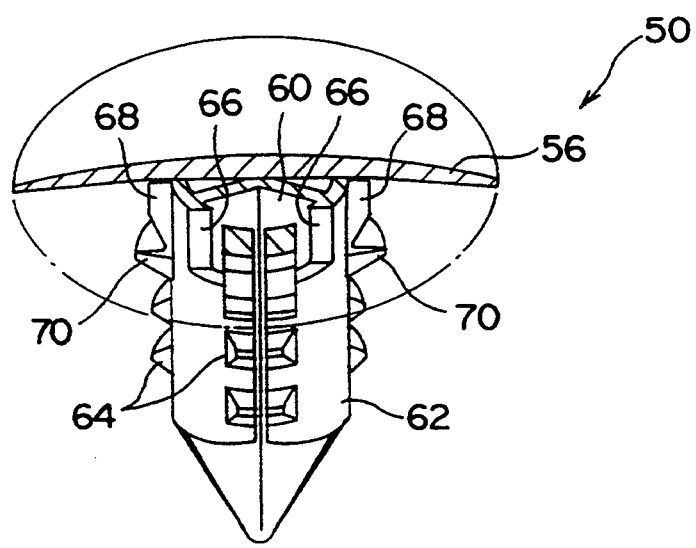
FIG. 6 is a perspective view of a clip relating to a second embodiment.
Figure 7:
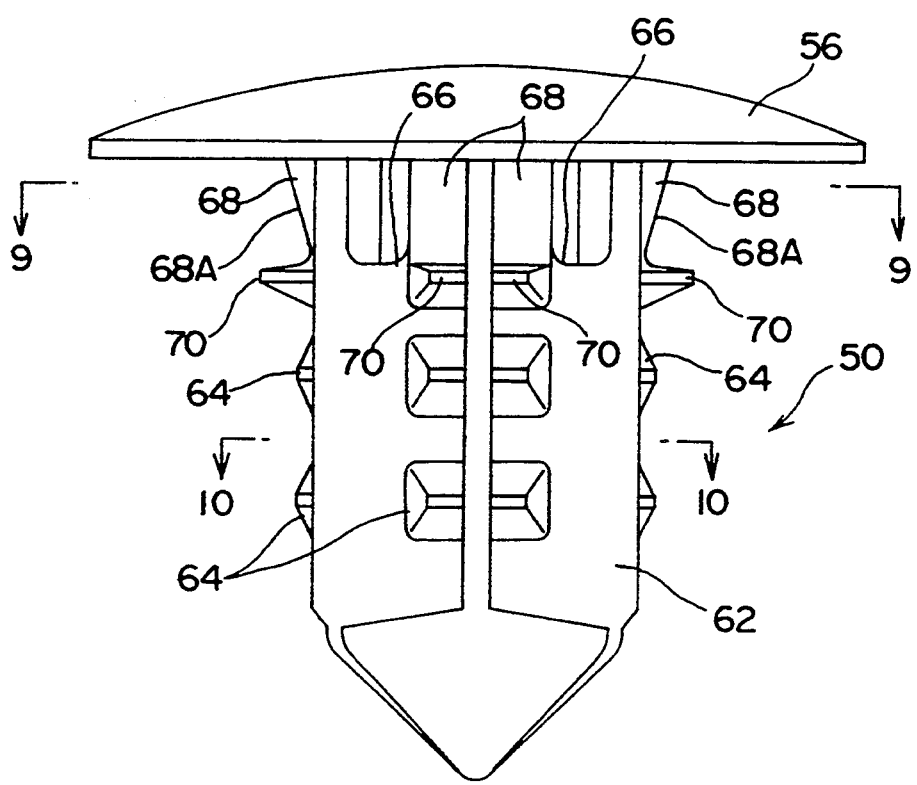
FIG. 7 is a side view of the clip relating to the second embodiment.
Figure 8:
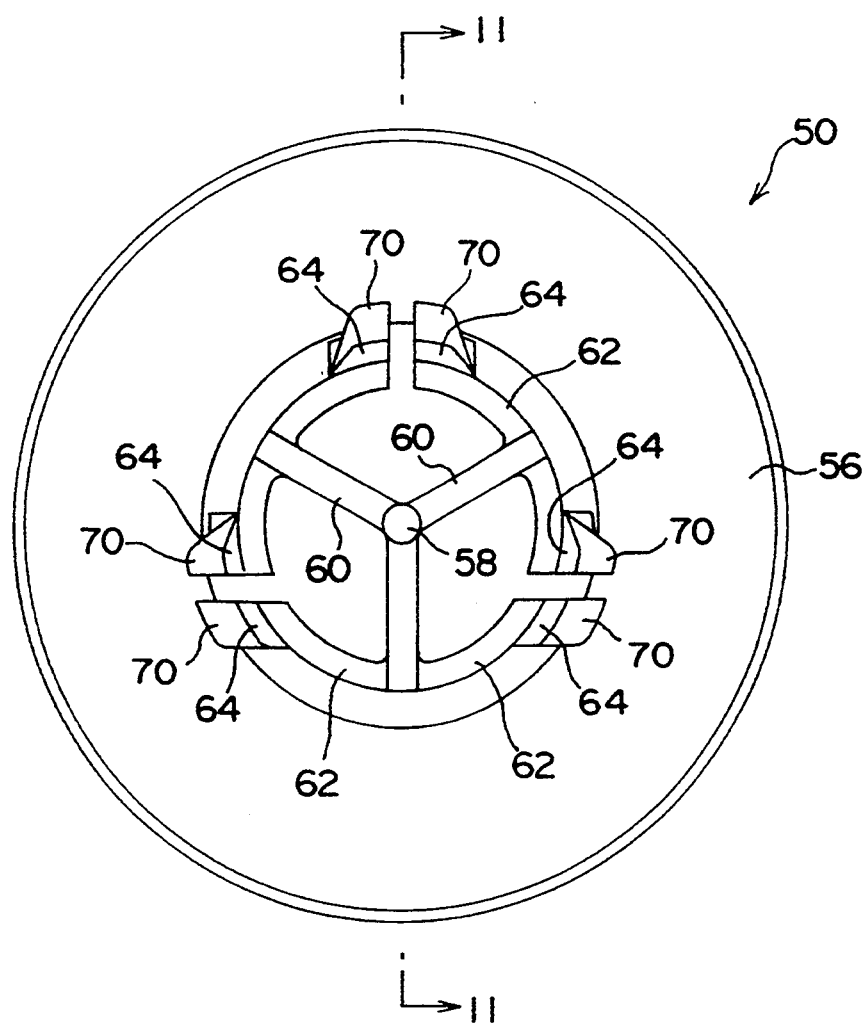
FIG. 8 is a bottom view of the clip relating to the second embodiment.
Figure 9:
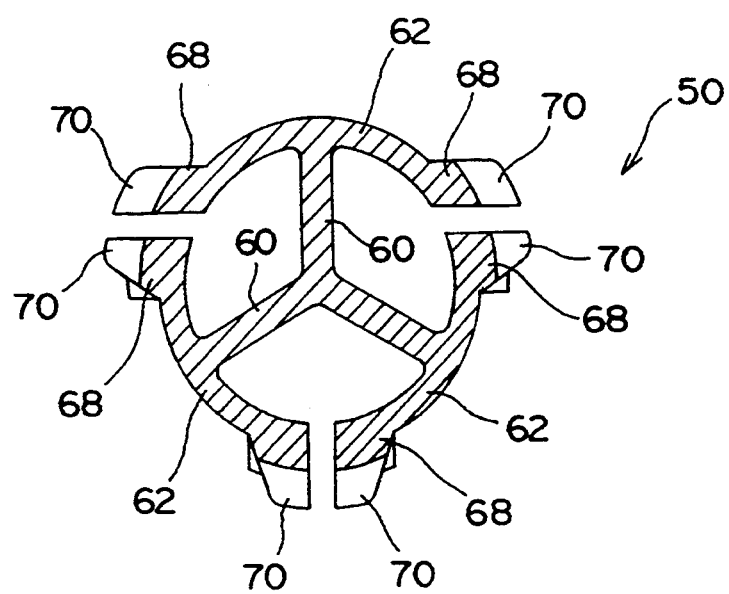
FIG.9 is a sectional view taken along line 9—9 of FIG. 7.
Figure 10:
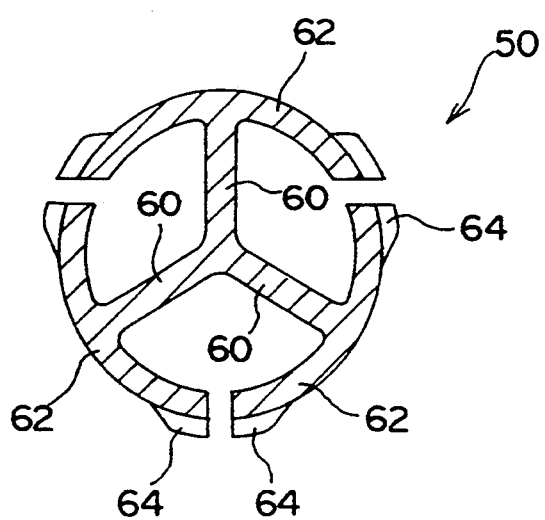
FIG. 10 is a sectional view taken along line 10—10 of FIG. 7.
Figure 11:
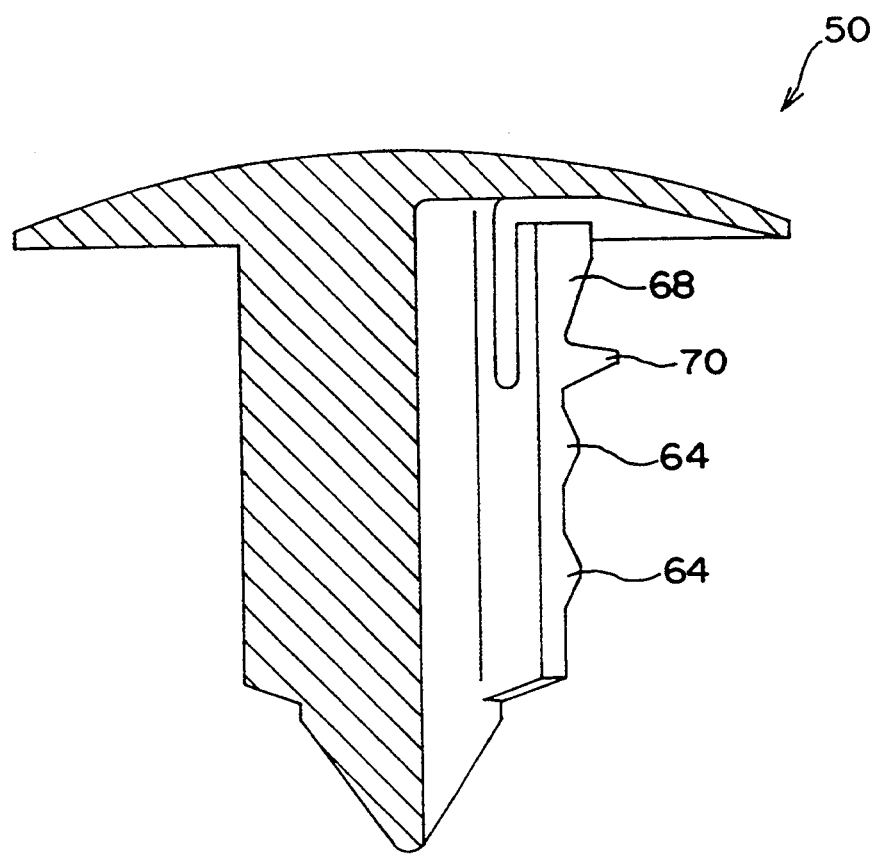
FIG. 11 is a sectional view taken along line 11—11 of FIG. 8.

As illustrated in FIG. 1, a clip 10 relating to the present invention is formed of an umbrella-shaped head portion 12 and a cylindrical leg portion 14. A core member 16 is provided at the axial portion of the leg portion 14. As illustrated in FIG. 3, three supporting plates 18, which are shaped as long plates, extend from the core member 16 in the radial direction of the clip 10. Further, as can be seen in FIG. 4, the supporting plates 18 extend along the longitudinal direction of the core member 16 so as to form a framework of the leg portion 14. Further, the tip of the end portion of the supporting plate 18 which is opposite the head portion 12 is thin and forms a guide portion 18A which is used to guide the leg portion 14 when the leg portion 14 is inserted into the mounting holes 24, 26 formed in the luggage trim 20 and the panel 22, respectively.

As shown in FIG. 3, a substantially central portion of an elastic plate 28 in the circumferential direction thereof is supported at the radial-direction outside end portion of the supporting plate 18. The cross-sectional configuration of the elastic plate 28, which is formed as if a hollow cylinder is cut in the axial direction thereof, is arc-shaped. Due to the elastic plate 28 being supported by the supporting plate 18, the elastic plate 28 bends around the supporting plate 18 toward the core member 16 such that the circumferential end portions of the elastic plate 28 are free end portions. The curvature of the outer circumference of the elastic plate 28 is set so as to correspond to the configuration of the mounting holes 24, 26 so that the elastic plate 28 can be inserted into the mounting holes 24, 26.

Figure 2:
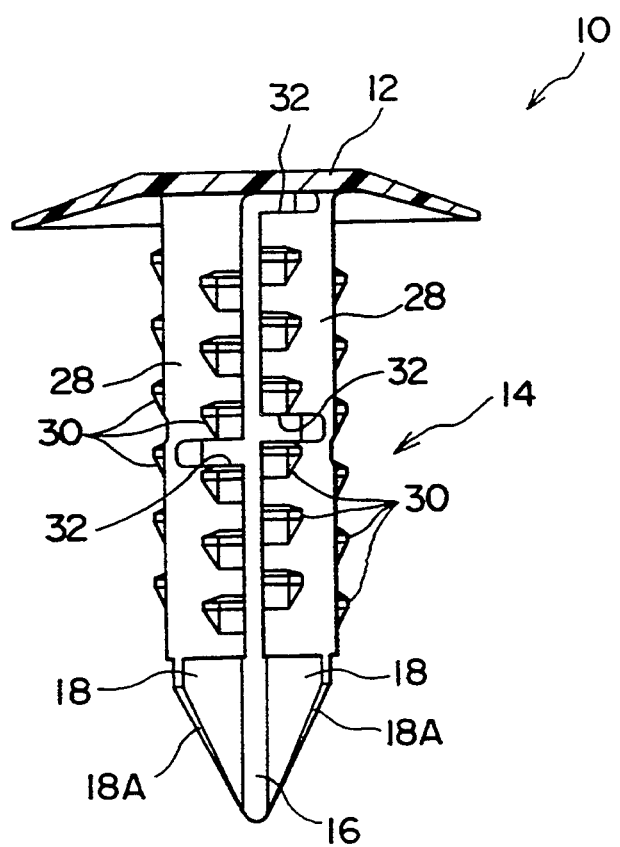
FIG. 2 is a side view of the clip relating to the present invention.

As illustrated in FIG. 2, a plurality of protrusions 30 are formed on the free end portions of the elastic plate 28. The protrusions 30, which are formed at predetermined intervals along the axis of the leg portion 14 and protrude toward the exterior in the radial direction of the leg portion 14, are arranged so as to form rows of protrusions. As illustrated in FIG. 4, the tip end of a peak portion 30A of the protrusion 30 is cut off so that the peak portion 30A is parallel to the axis of the leg portion 14. Taper portions 30B, serving as guide surfaces when the leg portion 14 is inserted and withdrawn, are formed from the peak portion 30A in directions of insertion and withdrawal of the leg portion 14 so as to facilitate insertion and withdrawal thereof. Further, the protrusions 30 are disposed such that the protrusions 30, which are in neighboring rows of protrusions which are adjacent to each other in the circumferential direction of the leg portion 14, are not disposed on a same circumferential direction line which is orthogonal to the axis of the leg portion 14. As a result, the outer circumferential surface of the elastic plate 28 always abuts the edge portion of the mounting hole 26 of the panel 22 regardless of the thickness of the luggage trim 20. Therefore, the protrusions reliably engage with the edge portion of the mounting hole 26 so that chatter does not occur after the clip 10 is inserted into the mounting holes 24, 26.

As shown in FIG. 2, slits 32 are formed in directions orthogonal to the axis of the leg portion 14 at portions of the elastic plates 28 which engage with the substantially central portion of the core member 16 in the axial direction thereof and which engage with the head portion 12. Because the slits 32 are formed in the elastic plate 28 in this way, portions of the elastic plate 28 in vicinities of the slits 32 bend in the direction of the core member 16.

Next, a description will be given of the processes and operation for mounting the luggage trim 20 to the panel 22 by using the clip 10 of the present embodiment.

First, the respective centers of the mounting hole 24 of the luggage trim 20 and the mounting hole 26 of the panel 22 are aligned. Next, the head portion 12 of the clip 10 is pushed, and the leg portion 14 is pushed into the mounting holes 24, 26 while being guided by the guide portions 18A. At this time, the protrusions 30 which protrude from the free end portions of the elastic plates 28 are pushed against the edge portions of the mounting holes 24, 26. Due to this pushing, the elastic plates 28 elastically deform, around the areas at which the elastic plates 28 are supported to the supporting plates 18, in the direction of the core member 16. The areas from which the protrusions 30 protrude thereby elastically deform. As a result, even if the clip 10 is repeatedly inserted and withdrawn, there is no abrasion of the protrusions 30. Further, when the elastic plates 28 pass through the mounting hole 26, they return to their original shapes due to their elastic force. Because the protrusions 30 are engaged with the edge portion of the mounting hole 26, the clip 10 does not fall out.

The respective joining portions of the supporting plates 18 and the elastic plates 28 do not elastically deform. However, because the outer radius of the joining portion is set substantially equal to the diameters of the mounting holes 24, 26, there is no resistance to the insertion of the leg portion 14.

When, for example, the luggage trim 20 and the panel 22 are thick, not only do the free ends of the elastic plates 28 bend around the supporting plates 18 toward the core member 16, but also both end portions of the elastic plates 28 in the direction of insertion bend toward the core member 16 due to the slits 32. Due to this bending, as the elastic plates 28 are bent in the direction of the core member 16 and are not effected by being pushed by the wall of the mounting hole 26, the configurations of the elastic plates 28 which have passed through the mounting hole 26 are the same as the configurations of the elastic plates 28 before insertion, and the protrusions 30 can engage with the edge portion of the mounting hole 26.

Next, a clip 50 relating to a second embodiment will be described.

Figure 12:
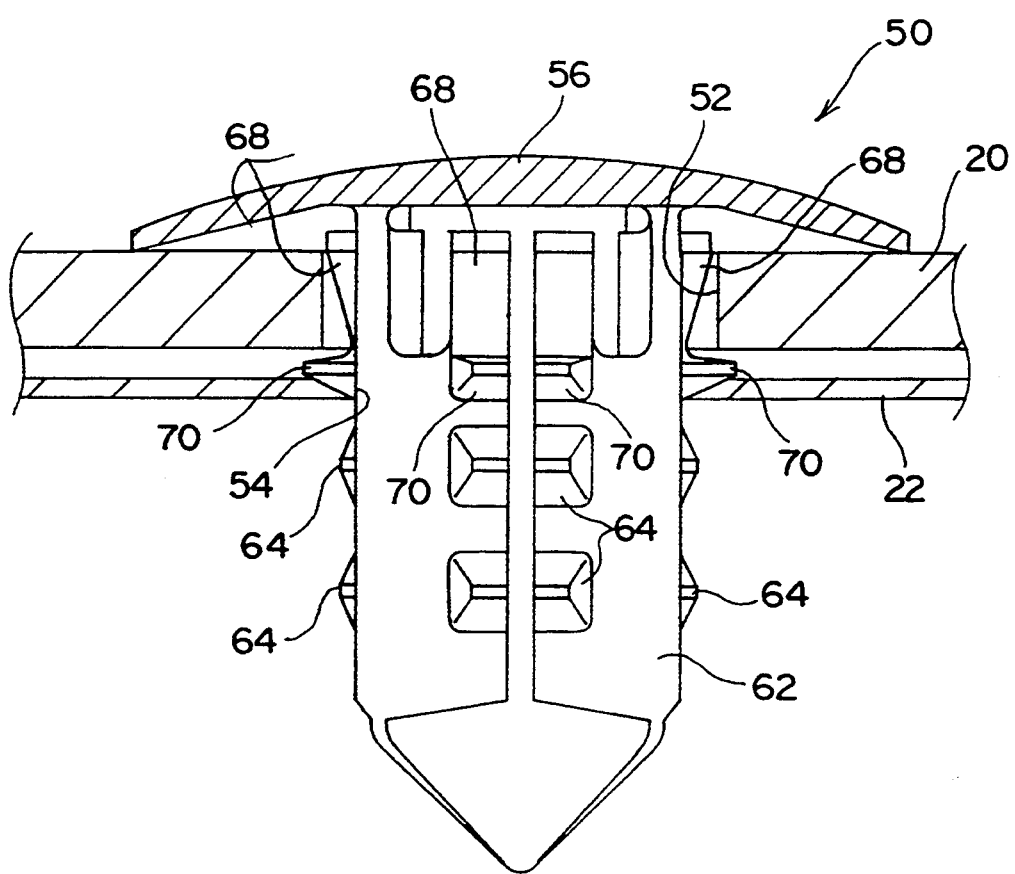
FIG. 12 is a sectional view illustrating an installed state of the clip relating to the second embodiment.
Figure 13:
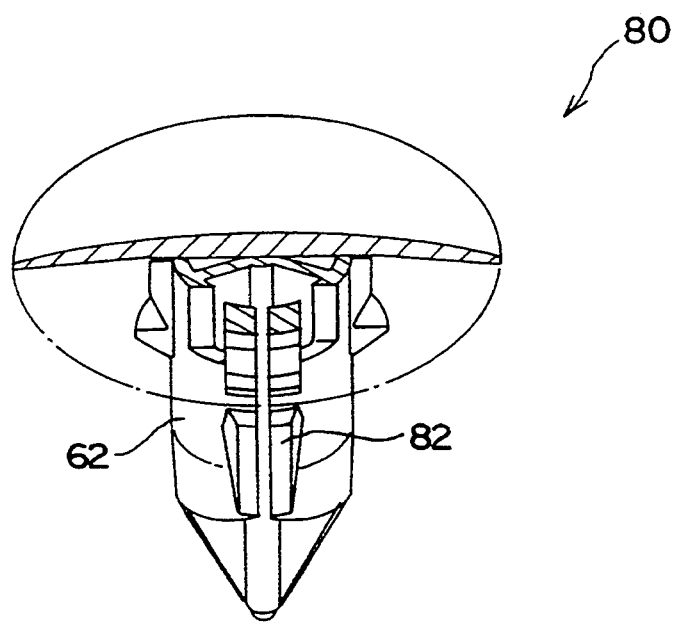
FIG. 13 is a perspective view of a clip relating to a variation of the second embodiment.
Figure 14:
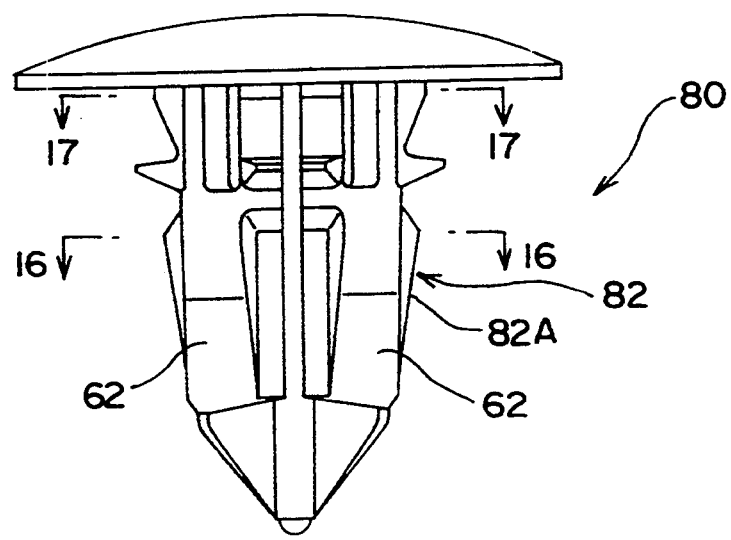
FIG. 14 is a side view of the clip relating to the variation of the second embodiment.
Figure 15:
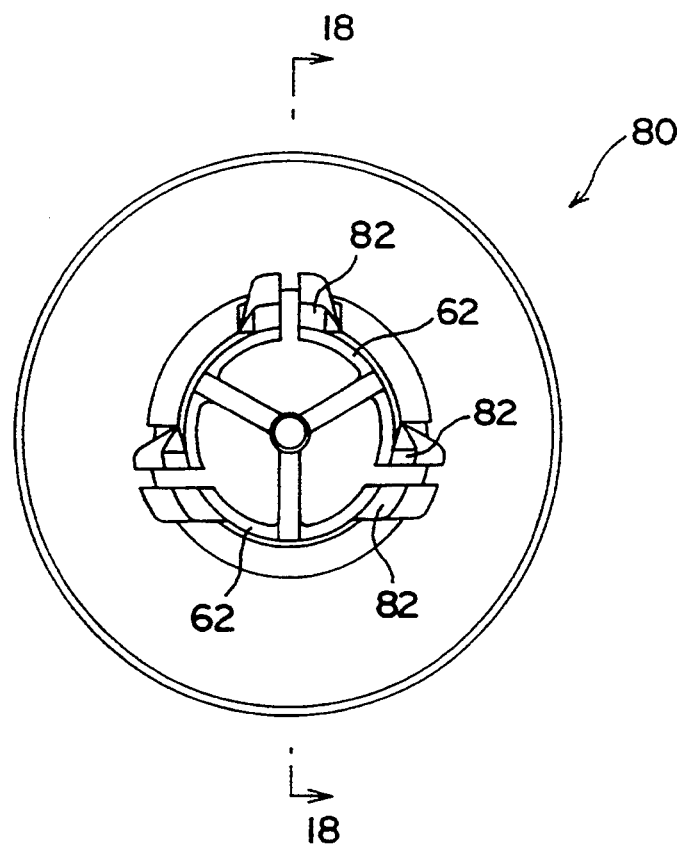
FIG. 15 is a bottom view of the clip relating to the variation of the second embodiment.
Figure 16:
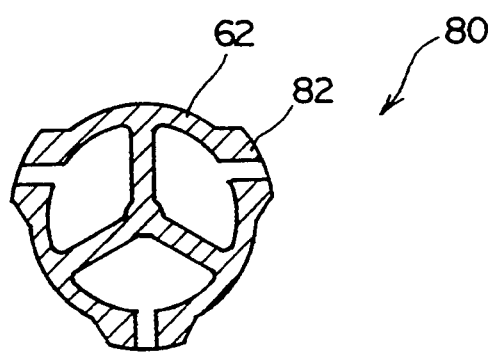
FIG. 16 is a sectional view taken along line 16—16 of FIG. 14.
Figure 17:
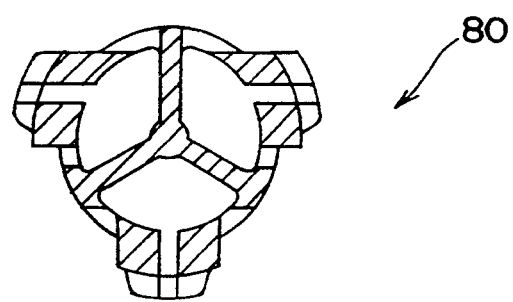
FIG. 17 is a sectional view taken along line 17—17 of FIG. 14.
Figure 18:
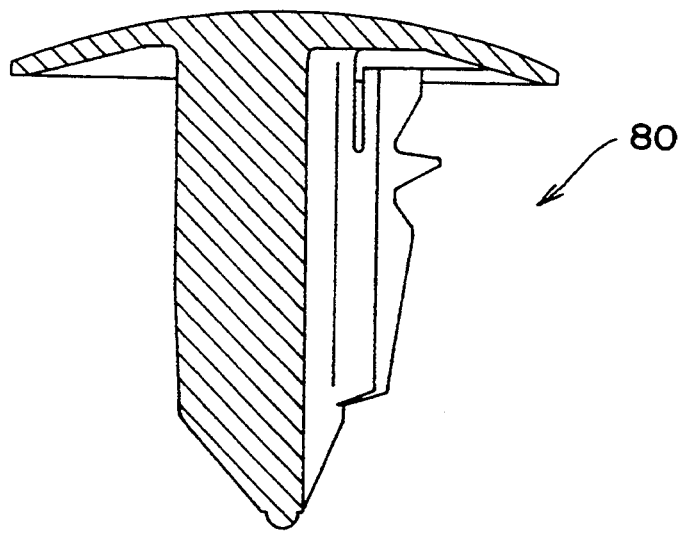
FIG. 18 is a sectional view taken along line 18—18 of FIG. 15.
Figure 19:
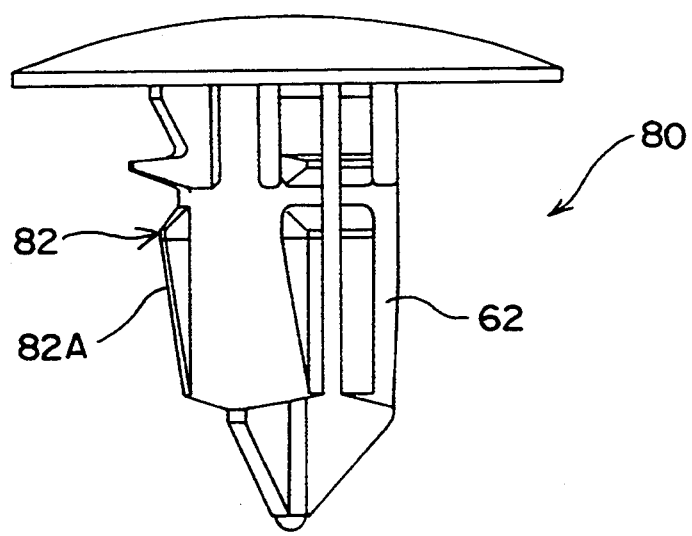
FIG. 19 is a side view of the clip relating to the variation of the second embodiment as seen from another angle.
Figure 20:
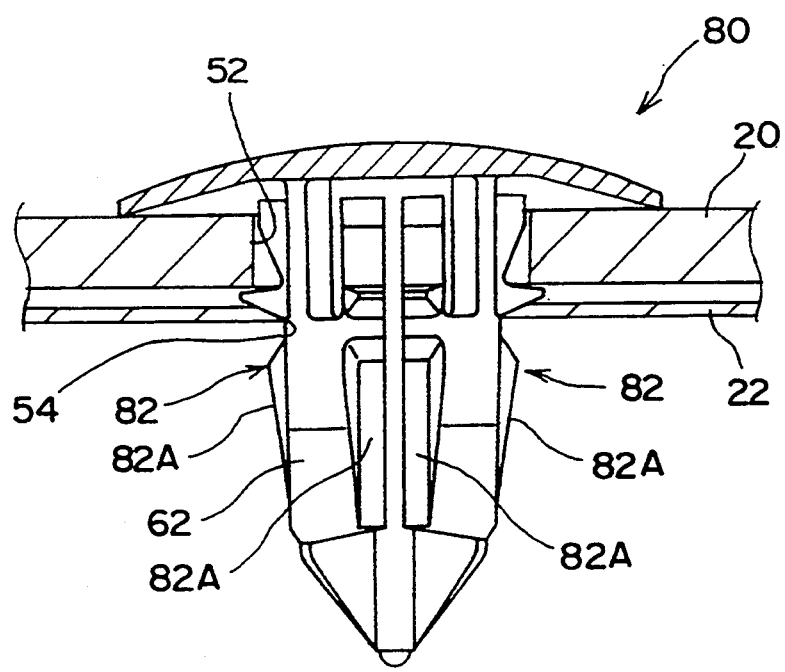
FIG. 20 is a sectional view illustrating an installed state of the clip relating to the variation of the second embodiment.
Figure 21:
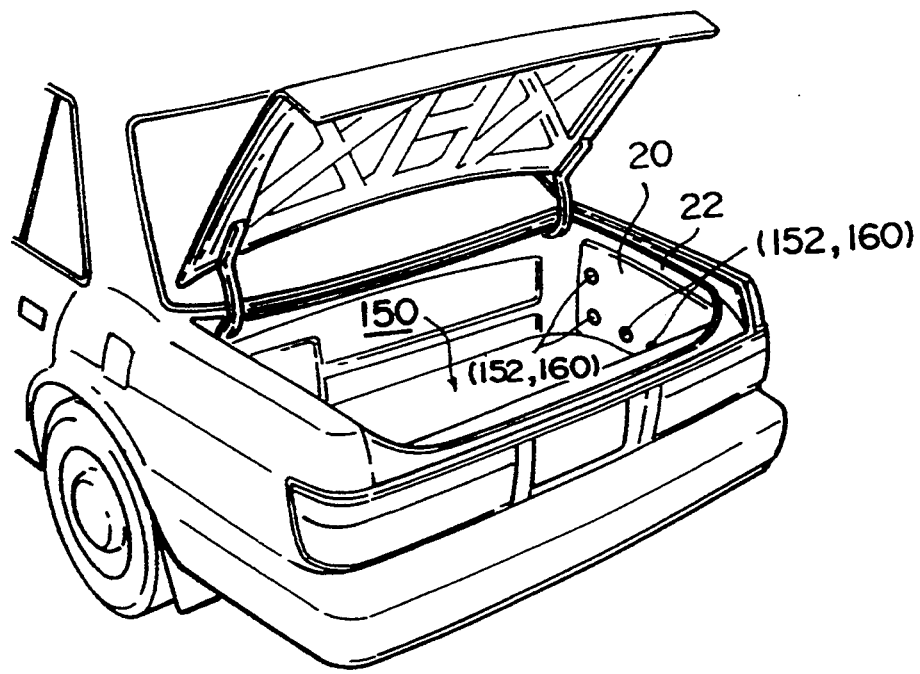
FIG. 21 is a schematic view illustrating a state in which trim is mounted to the interior of a trunk room by conventional clips.
Figure 22:
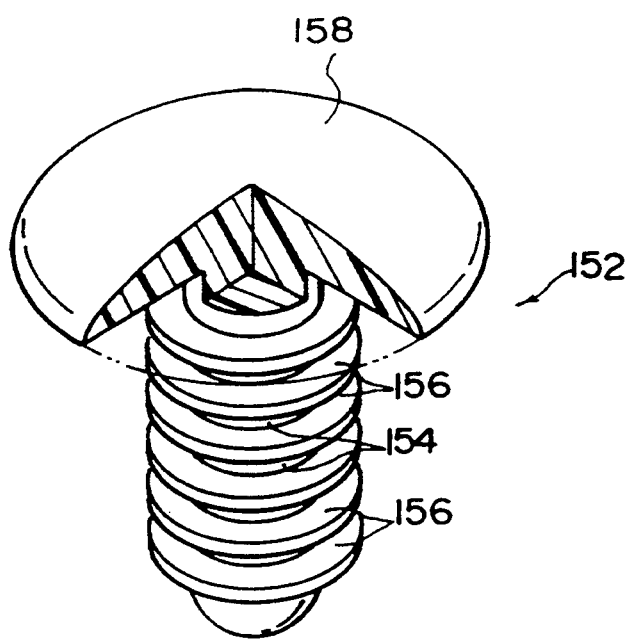
FIG. 22 is a perspective view of a conventional clip.
Figure 23:
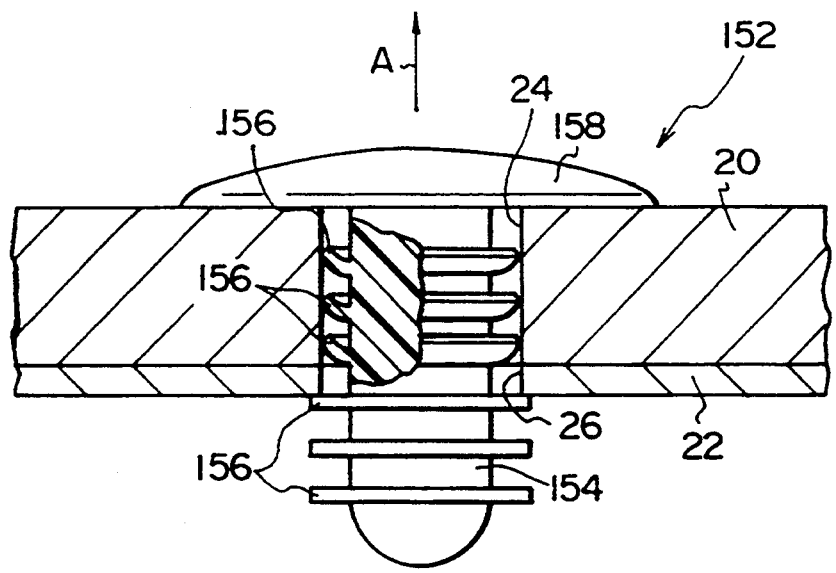
FIG. 23 is a sectional view of an installed state of the conventional clip.
Figure 24:
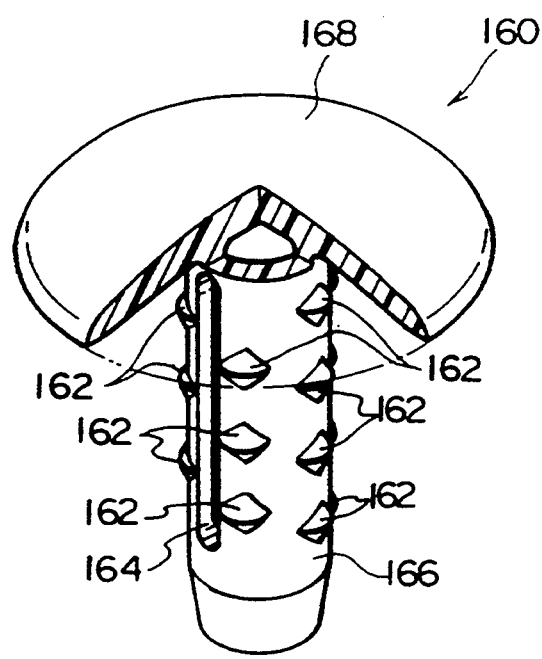
FIG. 24 is a perspective view of a conventional clip.
Figure 25:
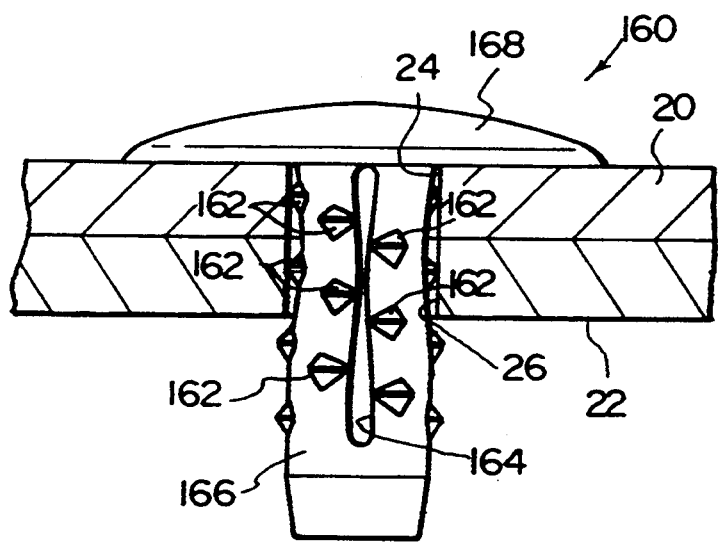
FIG. 25 is a sectional view of the installed state of the conventional clip.

As illustrated in FIG. 12, the function of the clip 50 of the second embodiment is exhibited in particular when the respective diameters of a mounting hole 52 of the luggage trim 20 and a mounting hole 54 of the panel 22 are different.

As illustrated in FIGS. 6-12, three supporting plates 60, which are shaped as long plates, extend radially from a core member 58 which extends from a head portion 56. An intermediate portion of an elastic plate 62, which has an arc-shaped cross sectional configuration, is supported at the radially outer end of the supporting plate 60. Due to the elastic plate 62 being supported in this way, both free end portions of the elastic plate 62 bend around the supporting plate 60 toward the core member 58. Further, a plurality of protrusions 64 are formed at the free end portions of the elastic plate 62 at predetermined intervals along the axis of the core member 58.

A slit 66 is formed along the axial direction of the core member 58 at an area of the elastic plate 62 in the vicinity of the head portion 56. An elastic pawl 68, which protrudes toward the outside in the radial direction, is formed at an area which remains after the slit 66 is cut out. The elastic pawl 68 has a tapered surface 68A which is inclined toward the core portion 58. A stopper 70 is formed at the final end portion of the tapered surface 68A which is positioned furthest from the head portion 56 along the axial direction of the core member 58. The stopper 70 protrudes from the outer circumferential surface of the elastic plate 62 toward the outside in the radial direction. In the regular state of the clip 50, the end of the stopper 70 protrudes further outward in the radial direction than the edge portion of the mounting hole 54 of the panel 22.

Next, operation of the clip 50 relating to the present embodiment will be described.

First, a leg portion 72 is inserted through the mounting hole 52 of the luggage trim 20. At this time, the leg portion 72 is pushed by the edge portion of the mounting hole 52 and is pushed in towards the core member 58 in accordance with the size of the diameter of the mounting hole 52. After the stoppers 70 have been inserted through the mounting hole 52, the diameter of the stoppers 70 increases such that the leg portion 72 engages with the mounting hole 52. At this time, the luggage trim 20 is securely interposed between the head portion 56 and the stoppers 70 which are adjacent to the elastic pawl 68. Accordingly, because the clip 50 does not fall out from the luggage trim 20, the work involved in mounting the clip 50 into the mounting hole 54 is effected smoothly.

A variation of the clip relating to the second embodiment is illustrated in FIGS. 13-20. In clip 80, one protrusion 82 protrudes from each free end portion of the respective elastic plates 62. A tapered surface 82A of the protrusion 82 is set to be relatively long in the axial direction of the core member 58. When the panel 22 is thick, the entire protrusion 82 is positioned within the mounting hole. In this way, work involved in removing the clip 82 is facilitated.

Accordingly, by changing the positions and the like of the protrusions, elastic claws, stoppers, and slits in accordance with the diameters of the mounting holes, hole lengths, and the like, a luggage trim can be mounted to a panel under optimal conditions by the clip of the present invention.

What is claimed is:

1. A clip comprising:
   a leg portion which is inserted through a mounting hole formed in a member to be mounted, and which is inserted into a mounting hole formed in a holding member which holds said member to be mounted;
   a head portion formed at one end portion of said leg portion, said member to be mounted being interposed between said head portion and said holding member so that said member to be mounted is fixed to said holding member;
   a core member provided in said leg portion so as to extend from one end portion of said leg portion to another end portion of said leg portion;
   a plurality of supporting members which are provided so as to extend in a radial direction from said core member and which are provided along a longitudinal direction of said core member;
   elastic deforming means, a portion of said elastic deforming means being supported at respective distal end portions of said plurality of supporting members, and said elastic deforming means being provided from the respective distal end portions of said plurality of supporting members along a circumferential direction of said mounting holes so as to correspond to a configuration of said mounting holes, and circumferential direction end portions of said elastic deforming means being elastically deformable in a substantially radial direction, and said elastic deforming means having a plurality of slits formed in a direction orthogonal to a longitudinal axis of said core member; and
   engaging means provided so as to protrude from at least one free end portion, which is provided at the circumferential direction end portion of said elastic deforming means, toward an outside in the radial direction of said core member.

2. A clip according to claim 1, wherein said engaging means is a plurality of protrusions.

3. A clip according to claim 2, wherein said plurality of protrusions forms rows of protrusions, and protrusions of said rows of protrusions are provided at predetermined intervals along an axis of said core member, and a number of said rows of protrusions is an integer multiple of a number of said plurality of supporting members, and said rows of protrusions are provided so as to be parallel to each other.

4. A clip according to claim 3, wherein respective positions of said protrusions of said rows of protrusions which are adjacent in a circumferential direction of said elastic deforming means are provided so as to not be on a same circumferential direction line which is orthogonal to an axial direction of said core member.

5. A clip according to claim 2, wherein at least one slit of said plurality of slits extends between two adjacent protrusions of said plurality of protrusions.

6. A clip according to claim 1, wherein said supporting member has a guide portion in a vicinity of the other end portion of said leg portion, a radial direction length of said guide portion becoming shorter toward the other end of said leg portion.

7. A clip according to claim 1, wherein said elastic deforming means is connected to the respective distal end portions of said plurality of supporting members at respective circumferential direction central portions of said elastic deforming means.

8. The clip according to claim 1, wherein each of said plurality of slits extends from a respective edge of an end portion of said elastic deforming means.

9. A clip comprising:
a leg portion which is inserted through a mounting hole formed in a member to be mounted, and which is inserted into a mounting hole formed in a holding member which holds said member to be mounted;
a head portion formed at one end portion of said leg portion, said member to be mounted being interposed between said portion and said holding member so that said member to be mounted is fixed to said holding member;
a core member provided in said leg portion so as to extend from one end portion of said leg portion to another end portion of said leg portion;
a plurality of supporting members which are provided so as to extend in a radial direction from said core member and which are provided along a longitudinal direction of said core member;
elastic deforming means, a portion of said elastic deforming means being supported at respective distal end portions of said plurality of supporting members, and said elastic deforming means being provided from the respective distal end portions of said plurality of supporting members along a circumferential direction of said mounting holes so as to correspond to a configuration of said mounting holes, and circumferential direction end portions of said elastic deforming means being elastically deformable in a substantially radial direction, and said elastic deforming means having a plurality of slits which are cut out along an axis of said core member from an end portion of said elastic deforming means which opposes said head portion, and said elastic deforming means having an elastic pawl between each of said plurality of slits and said free end portions, and said elastic pawl being provided so as to protrude from an outer circumferential surface of said elastic deforming means toward an outside in the radial direction of said core member, and when said leg portion is inserted through said mounting hole of said member to be mounted, said elastic pawl is pushed by said mounting hole so as to elastically deform toward an inside in the radial direction of said core member; and
engaging means provided so as to protrude from at least one free end portion, which is provided at the circumferential direction end portion of said elastic deforming means, toward an outside in the radial direction of said core member.

10. A clip according to claim 9, wherein said elastic deforming means has a stopper which is provided so as to protrude from the outer circumferential surface of said elastic deforming means toward the outside in the radial direction of said core member and which is provided such that a distal end portion of said stopper in the radial direction of said core member has a larger diameter than a diameter of said mounting hole of said holding member when said stopper is in a free state, said member to be mounted being securely interposed between said stopper and said head portion.

11. A clip according to claim 9, wherein said elastic deforming means is connected to the respective distal end portions of said plurality of supporting members at respective circumferential direction central portions of said elastic deforming means.

12. A clip comprising:
a leg portion which is inserted through a mounting hole formed in a member to be mounted, and which is inserted into a mounting hole formed in a holding member which holds said member to be mounted;
a head portion formed at one end portion of said leg portion, said member to be mounted being interposed between said head portion and said holding member so that said member to be mounted is fixed to said holding member;
a core member provided in said leg portion so as to extend from one end portion of said leg portion to another end portion of said leg portion;
a plurality of supporting plates which are provided so as to extend in a radial direction from said core member and which are provided along a longitudinal direction of said core member;
elastic deforming plates, a portion of said elastic deforming plates being supported at respective distal end portions of said plurality of supporting plates at respective circumferential direction central portions of said elastic deforming plates, and said elastic deforming plates being provided from the respective distal end portions of said plurality of supporting plates along a circumferential direction of said mounting holes so as to correspond to a configuration of said mounting holes, and circumferential direction end portions of said elastic deforming plates being elastically deformable in a substantially radial direction; and
a plurality of protrusions provided so as to protrude from free end portions, which are provided at the circumferential direction end portions of each of said elastic deforming plates, toward an outside in the radial direction of said core member.

13. A clip according to claim 12, wherein said plurality of protrusions forms rows of protrusions, and protrusions of said rows of protrusions are provided at predetermined intervals along an axis of said core member, and a number of said rows of protrusions is an integer multiple of a number of said plurality of supporting plates, and said rows of protrusions are provided so as to be parallel to each other, and respective positions of said protrusions of said rows of protrusions which are adjacent in a circumferential direction of said elastic deforming plates are provided so as to not be on a same circumferential direction line which is orthogonal to an axial direction of said core member.

14. A clip according to claim 13, wherein said supporting plate has a guide portion in a vicinity of the other end portion of said leg portion, a radial direction length of said guide portion becoming shorter toward the other end of said leg portion.

15. A clip according to claim 13, wherein said elastic deforming plate has a plurality of slits formed in a direction orthogonal to an axis of said core member.

16. A clip according to claim 12, wherein said elastic deforming plate has a plurality of slits formed in a direction orthogonal to an axis of said core member.

17. A clip according to claim 12, wherein said supporting plate has a guide portion in a vicinity of the other end portion of said leg portion, a radial direction length of said guide portion becoming shorter toward the other end of said leg portion.

18. A clip according to claim 17, wherein said elastic deforming plate has a plurality of slits formed in a direction orthogonal to an axis of said core member.

19. A clip comprising:
- a leg portion which is inserted through a mounting hole formed in a member to be mounted, and which is inserted into a mounting hole formed in a holding member which holds said member to be mounted;
- a head portion formed at one end portion of said leg portion, said member to be mounted being interposed between said head portion and said holding member so that said member to mounted is fixed to said holding member;
- a core member provided in said leg portions as to extend form one end portion of said leg portion to another end portion of said leg portion;
- a plurality of supporting plates which are provided so as to extend in a radial direction from said core member and which are provided along a longitudinal direction of said core member;
- elastic deforming plates, a portion of said elastic deforming plates being supported at respective distal end portions of said plurality of supporting plates, and said elastic deforming plates being provided from the respective distal end portions of said plurality of supporting plates along a circumferential direction of said mounting holes so as to correspond to a configuration of said mounting holes, and circumferential direction end portions of said elastic deforming plates being elastically deformable in a substantially radial direction, and said elastic deforming plates having a plurality of slits which are cut out along an axis of said core member from an end portion of said elastic deforming plates which opposes said head portion, and said elastic deforming plates having elastic pawls between each of said plurality of slits and said free end portions, and said elastic pawls being provided so as to protrude from an outer circumferential surface of said elastic deforming plates toward an outside in the radial direction of said core member, and when said leg portion is inserted through said mounting hole of said member to be mounted, said elastic pawls are pushed by said mounting hole so as to elastically deform toward an inside in the radial direction of sid core member; and
- a plurality of protrusions provided so as to protrude from each of said free end portions, which are provided at the circumferential direction end portion of each of said elastic deforming plates, toward an outside in the radial direction of said core member.

20. A clip according to claim 19, wherein said elastic deforming plates have stoppers which are provided so as to protrude from the outer circumferential surfaces of said elastic deforming plates toward the outside in the radial direction of said core member and which are provided such that a distal end portion of said stopper in the radial direction of said core member has a larger diameter than a diameter of said mounting hole of said holding member when said stoppers are in a free state, said member to be mounted being securely interposed between said stopper and said head portion.

21. A clip according to claim 19, wherein said elastic deforming plates are connected to the respective distal end portions of said plurality of supporting plates at respective circumferential direction central portions of said elastic deforming plates.

* * * * *